United States Patent
Graef et al.

(10) Patent No.: US 7,388,955 B2
(45) Date of Patent: *Jun. 17, 2008

(54) COMBINE AUDIO AND RINGING MODE

(75) Inventors: Klaus Graef, Bismarckstrasse (DE); Edgar Sexauer, Stuttgart (DE)

(73) Assignee: Dialog Semiconductor GmbH, Kirchheim/Teck-Nabern (DE)

( * ) Notice: Subject to any disclaimer, the term of this patent is extended or adjusted under 35 U.S.C. 154(b) by 467 days.

This patent is subject to a terminal disclaimer.

(21) Appl. No.: 11/048,438

(22) Filed: Feb. 1, 2005

(65) Prior Publication Data

US 2005/0130710 A1    Jun. 16, 2005

Related U.S. Application Data

(63) Continuation of application No. 09/995,195, filed on Nov. 27, 2001, now Pat. No. 6,873,705.

(51) Int. Cl.
H04B 1/38 (2006.01)
H04M 1/00 (2006.01)

(52) U.S. Cl. ............ 379/387.01; 455/219; 455/567; 379/388.03

(58) Field of Classification Search ............ 455/567, 455/219; 379/418, 388.01–390.04, 373.01–375.01
See application file for complete search history.

(56) References Cited

U.S. PATENT DOCUMENTS

| | | | | |
|---|---|---|---|---|
| 4,472,602 A | * | 9/1984 | Bordelon et al. | 379/388.02 |
| 5,170,430 A | * | 12/1992 | Schuh | 379/388.05 |
| 5,202,917 A | * | 4/1993 | Wakai | 379/159 |
| 5,307,407 A | | 4/1994 | Wendt et al. | 379/418 |
| 5,541,543 A | | 7/1996 | Arnaud | 327/175 |
| 5,768,364 A | * | 6/1998 | Karnowski et al. | 379/388.02 |
| 6,151,391 A | * | 11/2000 | Sherwood et al. | 379/391 |
| 6,252,784 B1 | | 6/2001 | Dobrenko | 363/21.12 |
| 7,167,569 B1 | * | 1/2007 | Seven | 381/111 |

* cited by examiner

*Primary Examiner*—Simon D Nguyen
(74) *Attorney, Agent, or Firm*—Saile Ackerman LLC; Stephen B. Ackerman

(57) ABSTRACT

A circuit where the same amplifiers and the same volume adjustment circuitry are used for the ringer mode as well as for the audio mode of a mobile phone is achieved. The volume adjustment in the audio and ringer mode is provided by a precise amplitude setting via the gain control stages of an inverting voltage amplifier used in a bridge circuit through a current-voltage conversion. This volume adjustment circuit avoids the high power dissipation of a volume control through pulse width modulation (PWM) and avoids the risk of over-and undershooting of the amplifier's output signal due to a high slew rate in combination with the inductance of the loudspeaker. The current-voltage conversion is performed by a series of resistors activated by a series of correspondent switches. High impedance current less sense paths are eliminating the parasitic effect of the resistance of low cost standard switches to adjust the volume of the loudspeaker in the audio and the ringer mode.

6 Claims, 3 Drawing Sheets

COMBINE AUDIO AND RINGING MODE

This is a continuation of patent application Ser. No. 09/995,195, filing date Nov. 27, 2001 now U.S. Pat. No. 6,873,705, Combine Audio And Ringing Mode, assigned to the same assignee as the present invention, which is herein incorporated by reference in its entirety.

BACKGROUND OF THE INVENTION (1) Field of the Invention

The invention relates to a mobile telephone circuit, and more particularly, to a combination of audio and ringing mode wherein both said modes are controlled by the same amplifiers and the same amplitude setting circuits to control the volume of the loudspeaker for both modes, (2) Description of the Prior Art The volume adjustment for ringing via a pulse width modulation (PWM) is not very precise. There is a risk of damaging the loudspeaker or the full dynamic range can not be exploited. This results in a high power dissipation which is independent of the volume. For small sound intensity this results in a poor efficiency. There is a risk of over-and undershooting of the amplifier's output signal due to the high slew rate in combination with the inductance of the loudspeaker.

In the current art the volume adjustment is done via a PWM control accepting the imprecise adjustment. There is no solution of the high power dissipation. The risk of over-and undershooting of the amplifier's output signal is solved with external protection diodes.

Several prior art inventions describe the ringer mode of circuits in telephone systems. U.S. Pat. No. 6,252,784 to Dobrenko describes a device for generating an electrical signal (for example a sine wave suitable for a ringer) whose output signal and power supply voltages are correctable through two feedback loops. U.S. Pat. No. 5,541,543 to Arnaud discloses a telephone set fitted with a speech signal loudspeaker also serving as a ringer and more particularly to a device for regulating the power provided to the loudspeaker during a ring signal. U.S. Pat. No. 5,894,212 to Wendt et al. shows a ring signal from a DC power supply using a pair of switches controlled by a pulse width modulation(PWM) circuit.

SUMMARY OF THE INVENTION

A principal object of the present invention is to provide a space saving and cost effective on-chip solution for mobile phones by using the same components for audio and ringer mode.

A further object of the present invention is to provide a precise volume adjustment for the ringer mode to be able to fully exploit the dynamic range of the loudspeaker without the risk of damaging the loudspeaker.

A still further object is to prevent the risk of over-and undershooting of the amplifier's output signal due to a high slew rate in combination with the inductance of the loudspeaker.

Another still further object of the present invention is to eliminate the parasitic effects of the resistance of the standard switches used to define the setting of the volume of the loudspeaker.

In accordance with the objects of this invention, a circuit using the same components in the ringer and audio mode of a mobile phone is achieved. The circuit using the same amplifiers and same means to define the volume of the loudspeaker in both ringer and audio mode is described in the invention. The layout of the total circuit is done in a mirrored bridge configuration. The circuit comprises a loudspeaker used in the audio and ringer mode, two identical pulse generators for the ringer mode, a configuration of switches to activate the circuitry either in the ringer or in the audio mode, means to set the volume of the loudspeaker in the ringer and in the audio mode and two identical amplifiers in a mirrored bridge configuration to control the audio mode as well as the ringer mode having an input and an output wherein said input is a reference voltage and either input from said pulse generators in the ringer mode or differential input from audio signals in the audio mode and said output is driving said loudspeaker.

Furthermore in accordance with further objects of the invention a circuit setting the volume of a loudspeaker in the audio mode of a mobile phone via a defined amplitude setting is achieved. The layout of the total circuit is done in a mirrored bridge configuration. The circuit comprises a loudspeaker, two identical amplifiers in a mirrored bridge configuration to control the audio mode having an input and an output wherein said input is a reference voltage and input from a differential input from audio signals in the audio mode and said output is driving said loudspeaker and 2 identical series of switches and correspondent resistors in a mirrored bridge configuration to define the volume of said loudspeaker in the audio mode by amplitude setting wherein one of said switches in each series in the same mirrored position is closed to define the output voltage desired through the chain of resistors between the closed switch and the loudspeaker.

Furthermore in accordance with objects of the invention a circuit setting the volume of a loudspeaker in the ringer mode of a mobile phone via a defined amplitude setting is achieved. The layout of the total circuit is done in a mirrored bridge configuration. The circuit comprises a loudspeaker, two identical pulse generators in a mirrored bridge configuration generating pulses for the ringer mode, two identical amplifiers in a mirrored bridge configuration to control the ringer mode having an input and an output wherein said input is a reference voltage and input from a current less sense path to control the ringer pulses and said output is driving said loudspeaker and 2 identical series of switches and correspondent resistors in a mirrored bridge configuration to define the volume of said loudspeaker by setting the amplitude desired wherein one of said switches in each series in the same mirrored position is closed to define the output voltage desired through the chain of resistors between the closed switch and the loudspeaker.

Furthermore in accordance with the objects of this invention, a circuit using the same components in the ringer and audio mode of a mobile phone is achieved. The volume adjustment in both audio and ringer mode is provided by a precise amplitude setting via the gain control stages of inverting voltage amplifiers. Same amplifiers are being used in the audio and ringer mode and same switches and resistors acting as control stages of the amplifiers are used for the setting of the volume of the loudspeaker. The layout of the total circuit is done in a mirrored bridge configuration. The circuit comprises a loudspeaker used in the audio and ringer mode, two identical pulse generators for the ringer mode, a configuration of switches to activate the circuitry either in the ringer or in the audio mode, two identical amplifiers in a mirrored bridge configuration to control the audio mode as well as the ringer mode having an input and an output wherein said input is a reference voltage and either input from said pulse generators in the ringer mode or differential input from audio signals in the audio mode and said output is driving said loudspeaker and 2 identical series of switches and correspondent resistors in a mirrored bridge configuration to define the volume of said loudspeaker by setting the amplitude desired wherein one of said switches in each series in the same mirrored position is closed to define the output voltage desired through the chain of resistors between the closed switch and the loudspeaker.

BRIEF DESCRIPTION OF THE DRAWINGS

In the accompanying drawings forming a material part of this description, there is shown.

DESCRIPTION OF THE PREFERRED EMBODIMENTS

The preferred embodiments disclose a novel circuit enabling the sharing of circuit components used for controlling both ringer and audio mode of a mobile phone. The same amplifiers and the same gain control stages are used for both ringer- and audio mode. For the ringer mode the volume adjustment is performed via a precisely defined amplitude setting of the ringer pulses. In prior art the volume adjustment of the ringer mode is performed usually using pulse-width modulation (PWM) of the ringer pulses. The volume adjustment for ringing via PWM is not very precise. It causes the risk of damaging the loudspeaker or the full dynamic range can not be exploited. The control of the ringer pulses via a defined setting of the amplitude of said pulses is much more effective. The switches used for the volume control of the ringer are arranged in a way that their on-resistance does not contribute to a parasitic effect in the pulse generation.

Figure 1:
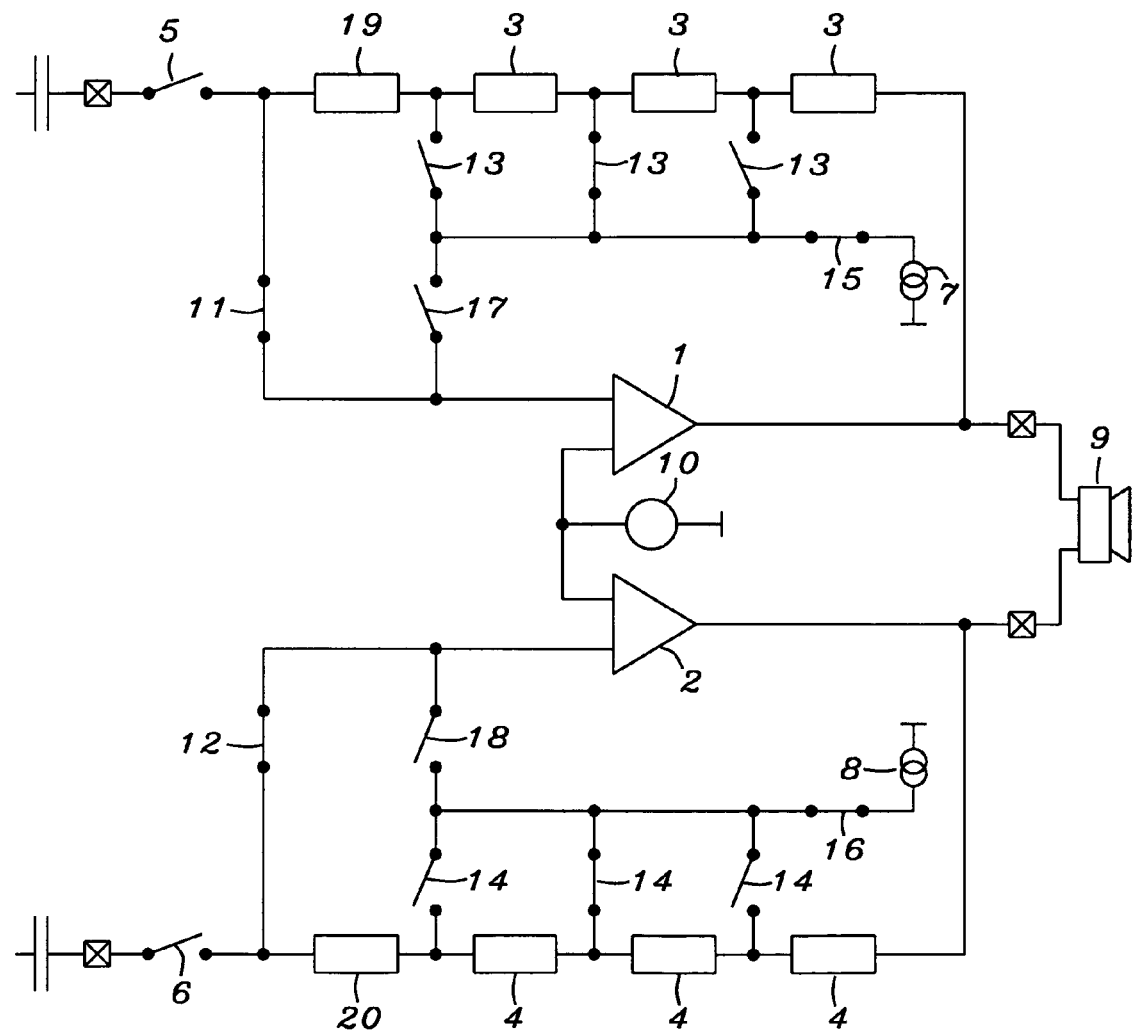
FIG. 1 illustrates a preferred embodiment of the present invention in the ringer mode.

Referring now to FIG. 1, the principal layout of the preferred embodiment of the configuration of the ringer mode in the present invention is illustrated. The total circuit is done in a bridge configuration. The amplifiers 1 and 2 and the strings of gain resistors 3 and 4 are identical. In the ringer mode the switches 5 and 6 are open. To create a ringer signal for the loudspeaker 9 a current with rectangular wave form is supplied to the string of gain resistors by the pulse generators 7 and 8 via the closed switches 15 and 16. A reference voltage 10 is supplied to the 2 amplifiers working in inverted mode. The resistive switches 11, 12, 17 and 18 are used in high impedance sense paths. Said switches 11 and 12 are closed in the ringer mode and open in the audio mode. Said switches 17 and 18 are closed in the audio mode and open in the ringer mode. For a defined amplitude setting the resistor strings 3 and 4 are used together with the string of correspondent resistive gain switches 13 and 14. The number of resistors in the string of gain resistors and in the string of correspondent resistive switches could be any number n. The more resistors and switches are used the finer will be the definition of the volume setting of the loudspeaker. Only one switch will be closed in each of the strings of gain switches 13 and 14 to define the volume of the ringing signal at the same time. All said switches can be minimum in size and the tolerances in manufacturing process and temperature are not critical at all.

Said gain switches are digitally programmed to ensure a faultless operation. They are controlled digitally by an external micro controller interface. As example in an existing embodiment internal gain registers are used to define the gain setting. The volume setting is controlled by an external micro controller.

The combination of resistors and switches together with the amplifier is performing a current to voltage conversion. The switches 11 and 12 are closed in the ringer mode and open in the audio mode. They are providing a current less high impedance sense path for the ringer mode. The correspondent switches 17 and 18 are open in the ringer mode and closed for the audio mode. They are providing a current less high impedance sense path for the audio mode.

Figure 2:
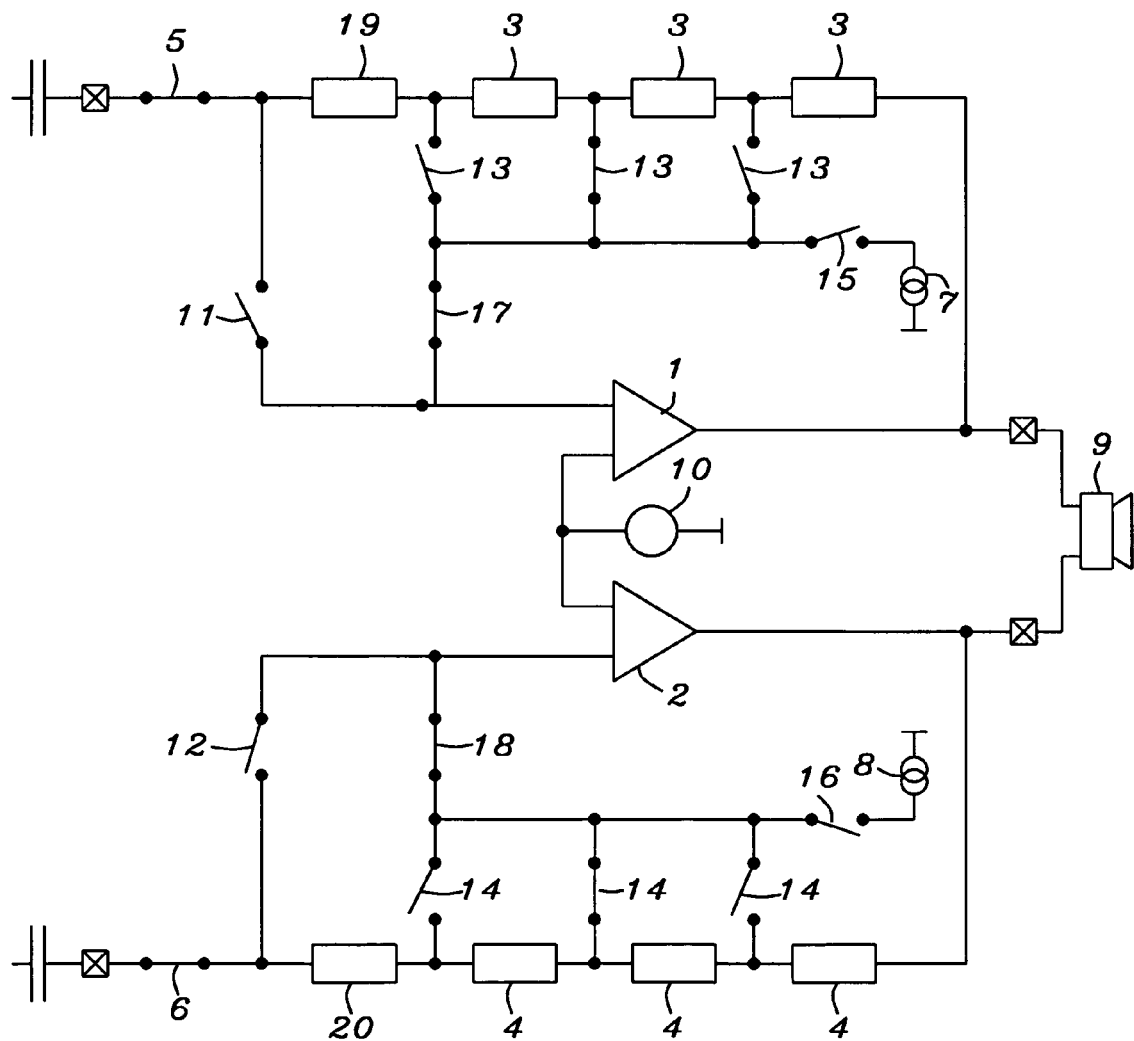
FIG. 2 illustrates a preferred embodiment of the present invention in the audio mode.

Referring now to FIG. 2, the preferred embodiment of the configuration of the audio mode in the present invention is illustrated. The same numbers are used to identify the same components as described in the FIG. 1. The switches 5 and 6 are closed to receive the differential audio input. The resistors 19 are 20 are the entry resistors for the audio mode. The switches 15 and 16 are open to disconnect the ringer pulse generator. The switches 11 and 12 are open to disable the current less sense path of the ringer mode. The switches 17 and 18 are closed to provide a current less high impedance sense path for the audio signals to eliminate the parasitic effects of the resistance of the gain resistors 3 and 4. The gain of the audio signals is adjusted the same way as the volume of the ringer signals through the same strings of gain resistors 3 and 4 and the correspondent strings of the gain switches 13 and 14.

The resistance of a resistive switch will add additional tolerance to the output amplitude of the ringer and audio signal. The resistance of the resistive switches must be small compared to the resistance of the string of gain resistors, e.g., the parasitic effect to the amplitude of the ringer signal will reach 2% if the resistance of the switch amounts to 2% of the resistance of the string of gain resistors active according to the setting of the gain switch.

Figure 3:
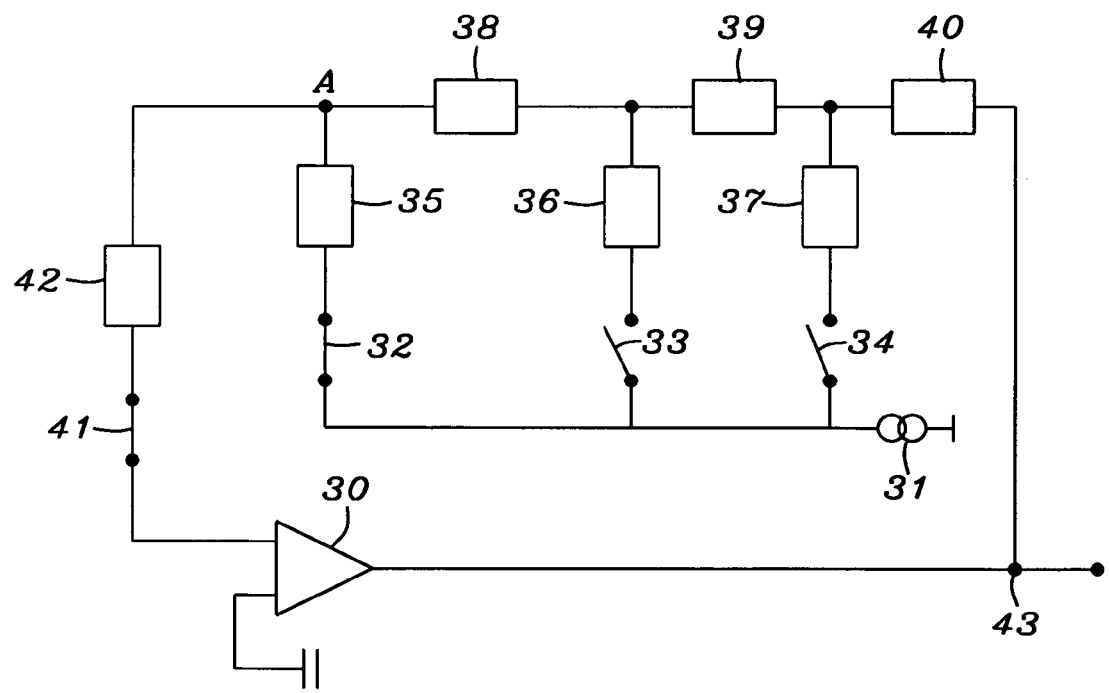
FIG. 3 illustrates the principal layout of the setting of the amplitudes to control the volume of the loudspeaker and the sense path to eliminate the parasitic effects of the resistance of the gain switches.

FIG. 3 illustrates the principal layout of the setting of the amplitudes to control the volume of the loudspeaker and a sense path to eliminate the parasitic effects of the resistance of the gain switches. In order to avoid unnecessary complexity one half of the bridge circuit only is shown. The example shows the current less high impedance sense path in the ringer mode. In the audio mode the functionality of the current less sense path is exactly the same as in the ringer mode. The preferred embodiment in reality is comprising 2 identical circuits as showed in FIG. 1 and FIG. 2. In FIG. 3 a differential amplifier 30, a pulse generator 31, a string of gain switches 32 to 34 having their correspondent switch resistance values 35 to 37, a string of correspondent gain resistors 38 to 40, the switch 41, having the resistance 42, providing a current less high impedance sense and the output voltage to the loudspeaker Vout 43 is shown. Node A signifies the gain switch being closed in the series of gain resistors. In the example shown this happens to be the first gain switch. While in the drawing as example only 3 gain switches and 3 correspondent resistors are shown real embodiments could have much more switches and resistors. Without the current less sense path to the amplifier the output voltage 43 Vout amounts to $$Vout = Iring(Rswitch + Rgain)$$

wherein Vout is the voltage at the loudspeaker, Iring is the current generated by the pulse generator 31, Rswitch is in the example shown the resistance of the closed gain switch 35 and Rgain is the total resistance of the resistors between the node A and the loudspeaker, in the example shown the total resistance of the resistors 38 to 40. This shows how the resistance of the gain switches adds additional tolerances to the output amplitude provided to the loudspeaker. This means that the resistance Rswitch has to be very small to minimise parasitic effect to the output signal. Switches with such a low resistance are much more expensive compared to standard switches. The parasitic effect of Rswitch is eliminated by the implementation of a current less high impedance sense path to the amplifier over the switch 41. The impedance of this sense path is much higher than the total resistance of the gain resistors, e.g., 3 G$\Omega$ compared to a total of 70 K$\Omega$ for the gain resistors. The regulator loop is closed from the node A. This configuration eliminates the parasitic effects of the resistance of the gain switches up to 10 K$\Omega$. Due to the big difference between the resistance of high impedance sense path and the total resistance of the gain resistors said elimination of the said parasitic effects of the resistance of the gain switch turned ON works independently of which individual gain switch is activated. This reduces the manufacturing costs by allowing the usage of standard switches with a relative high impedance.

Using pulse width modulation (PWM) of the ringer pulses generates the risk of over-and undershooting of the amplifier's output signal due to the high slew rate in combination with the inductance of the loudspeaker. In the present invention the limitation of the bandwidth of the audio amplifier is used to limit the slew rate of the ringer pulses.

The advantages of the present invention may now be summarized. The present invention provides an effective and very space saving and cost effective on-chip solution by sharing same components in both ringer and audio mode of a mobile phone. The control of the ringer pulses by a defined amplitude setting of the ringer pulse is much more precise than the setting by pulse width modulation (PWM). The risk of damaging the loudspeaker or that the full dynamic range cannot be exploited is avoided by the invention. Additionally the proposed setting of the amplitudes is much more effective and avoids the high power dissipation caused by the volume setting with PWM. This high power dissipation is independent of the volume when using PWM. The implementation of a current less sense path eliminates parasitic effects caused by the resistance of the switches used for gain control and allows the usage of low cost standard switches. The risk of over-and undershooting of the amplifier's output signal is eliminated by the limited bandwidth of the audio amplifier in a mobile phone.

As shown in the preferred embodiments, the novel circuit provides an effective and manufacturable alternative to the prior art.

While the invention has been particularly shown and described with reference to the preferred embodiments thereof, it will be understood by those skilled in the art that various changes in form and details may be made without departing from the spirit and scope of the invention.

What is claimed is:

1. A method to share circuit components to control both ringer and audio components of a mobile phone comprising:
provide a loudspeaker, two identical pulse generators, a configuration of switches; means of setting the volume of the loudspeaker, and two identical inverting voltage amplifiers;
use the loudspeaker in both the ringer and the audio mode;
control the ringer pulses via a defined setting of the amplitude of pulses of said pulse generators;
activate either the ringer mode or the audio mode by said configuration of switches;
use said two identical inverting voltage amplifiers to control the audio mode as well as the ringer mode.

2. The method of claim 1 wherein said configuration of switches is arranged in a mirrored bridge configuration.

3. The method of claim 1 wherein said two identical inverting voltage amplifiers are arranged in a mirrored bridge configuration wherein their output is driving said loudspeaker and their inputs are a reference voltage and pulses from said pulse generators in the ringer mode.

4. The method of claim 1 wherein said two identical inverting voltage amplifiers are arranged in a mirrored bridge configuration wherein their output is driving said loudspeaker and their inputs are a reference voltage and differential input from audio signals in the audio mode.

5. The method of claim 1 wherein said setting of the volume of said loudspeaker in the audio mode is performed by two identical series of switches and correspondent resistors in a mirrored bridge configuration adjusting the gain of said inverting voltage amplifiers and hereby defining the volume of said loudspeaker wherein one of said switches in each series in the same mirrored position is closed to define the output voltage desired through the chain of resistors between the closed switch and the loudspeaker.

6. The method of claim 1 wherein said setting of the volume of said loudspeaker in the ringer mode is performed by two identical series of switches and correspondent resistors in a mirrored bridge configuration by amplitude setting of pulses of said pulse generators hereby defining the volume of said loudspeaker wherein one of said switches in each series in the same mirrored position is closed to define the output voltage desired through the chain of resistors between the closed switch and the loudspeaker.

* * * * *